United States Patent [19]

Wilson

[11] Patent Number: 4,912,724
[45] Date of Patent: Mar. 27, 1990

[54] BIDIRECTIONAL BUS ARRANGEMENT FOR A DIGITAL COMMUNICATION SYSTEM

[75] Inventor: Terry O. Wilson, Ottawa, Canada

[73] Assignee: Northern Telecom Limited, Montreal, Canada

[21] Appl. No.: 743,465

[22] Filed: Jun. 11, 1985

[51] Int. Cl.⁴ .............................................. H04B 1/38
[52] U.S. Cl. ......................................... 375/7; 375/36; 370/85.1
[58] Field of Search ...................... 375/7, 36; 307/254, 307/455, 466; 330/261, 69; 370/85; 179/2 C, 2 DP; 333/32, 33

[56] References Cited

U.S. PATENT DOCUMENTS

| | | | |
|---|---|---|---|
| 2,148,098 | 2/1939 | Bowman-Manifold | 333/130 |
| 3,585,399 | 6/1971 | Andrews, Jr. | 375/36 |
| 3,657,478 | 4/1972 | Andrews, Jr. | 375/36 |
| 3,718,762 | 2/1973 | Nezu et al. | 375/36 |
| 3,827,026 | 7/1974 | Viswanathan | 375/36 |
| 4,090,154 | 5/1978 | Hauchart | 333/32 |
| 4,388,725 | 6/1983 | Saito et al. | 375/36 |
| 4,490,631 | 12/1984 | Kung | 307/254 |

Primary Examiner—Douglas W. Olms
Assistant Examiner—Stephen Chin
Attorney, Agent, or Firm—F. P. Turpin

[57] ABSTRACT

A bidirectional data bus arrangement is realized with the use of a single matching resistor. This is achieved by using a current sourcing driver gate which exhibits a low impedance HIGH-state and by using the junction of the series resistor and the transmission line as the receiving node at that end of the line. When the resistor end of the transmission line is receiving data from the other end, the resistor effectively serves as a parallel terminating resistor for the transmission line.

1 Claim, 1 Drawing Sheet

BIDIRECTIONAL BUS ARRANGEMENT FOR A DIGITAL COMMUNICATION SYSTEM

The invention relates generally to digital communication systems and more particularly to a bidirectional bus arrangement for such a system.

BACKGROUND OF THE INVENTION

A digital communication system usually has one or more data buses for transporting information between various portions of the system. Each bus may be a two-wire balanced system or a single-wire with common ground unbalanced system and usually comprises one, four, eight, sixteen or thirty-two wires or paths. In addition, a bus may be unidirectional, in which case it is adapted to transfer information in only one direction or it may be bidirectional and is adapted for the transmission of data in both directions. Each path of the bus exhibits the characteristics of a transmission line including a characteristic impedance which may be predetermined by design choice of material, spacing of conductors, and other factors influencing the distributed elements of the transmission line.

It is important in a data bus system to have the minimum amount of noise generated by undesired reflectors at the driver and receiver gates. This result is achieved by matching the characteristic impedance of each transmission line with an impedance circuit connected to the bus.

The majority of transmission lines have fairly low characteristic impedances; these can range from about fifty to two hundred ohms with a nominal value of about one hundred and twenty ohms. The current necessary to obtain a reasonable voltage swing on such a bus line may be quite large. It is more difficult to couple noise into this low impedance, but it is more difficult to drive, and line drivers must be capable of supplying the necessary current.

The conventional bidirectional bus in a common ground unbalanced system usually comprises a transmission line, including a wire, having a driver gate and a receiver gate at each end of the wire. The gates employed as driver gates are off-the-shelf components available from the semiconductor manufacturers. They are usually three-state devices which when gated OFF offer an almost infinite impedance to the line connected at their output. Since a data bus is basically a transmission line exhibiting a characteristic impedance ($Z_0$), a termination at the opposite end is necessary for each direction of driving. By conventional circuit theory (Thevenin's theorem), it may be determined that a matching impedance network for matching a $Z_0$ of 120 ohms is a combination of two resistors from power rail to ground of about 220 and 330 ohms respectively with the junction of the resistors connected to the bus. This type of bidirectional bus arrangement is commonly used in present day digital equipment.

On the other hand, in an application such as an address bus for a memory system, a unidirectional bus system is used. In the realization of such a bus system, it is known to use a matching resistor at the driver end of the transmission line. This resistor is connected in series between a driver gate and the transmission line and is chosen to match its characteristic impedance. The advantage of the circuit is that if the input impedance of the receiver is high, very little power is dissipated and current only flow during the transition time which is twice the line delay time.

SUMMARY OF THE INVENTION

It has been found that a bidirectional bus system may be realized with the use of a single matching resistor. This is achieved by using a driver gate which is not a three-state device and by using the junction of the series resistor and the transmission line as the receiving node when the resistor end of the transmission line is receiving data from the other end; in this instance, the resistor is effectively connected in parallel with the transmission line and serves to terminte the line.

In accordance with the invention, there is provided a bidirectional data bus arrangement comprising a transmission line having a first end and a second end, the first end terminating at a first node connected to a first gate for receiving data transmitted on the transmission line in a first direction and to one end of a resistor. The other end of the resistor is connected to the output terminal of a current sourcing line driver gate adapted to be controlled for transmitting data on the transmission line through the resistor. The resistor has a value approximately matching that of the characteristic impedance of the transmission line. The second end of the transmission line terminates at a second node connected to a second gate for receiving data transmitted on the line in a second direction and to a third gate for outputting data on the line.

The circuit provides marked advantages over the conventional line termination method described above. Firstly, for each line of the bus, only one resistor is used in the circuit of the invention whereas four resistors are used in the conventional bidirectional circuit. This results in substantial cost savings as well as surface economy of the printed circuit board. In addition, a substantial power saving is realized with all the ensuing advantages of economy and heat dissipation considerations.

BRIEF DESCRIPTION OF THE DRAWING

An example embodiment of the invention will now be described in conjunction with the drawings in which.

DETAILED DESCRIPTION

Figure 1:
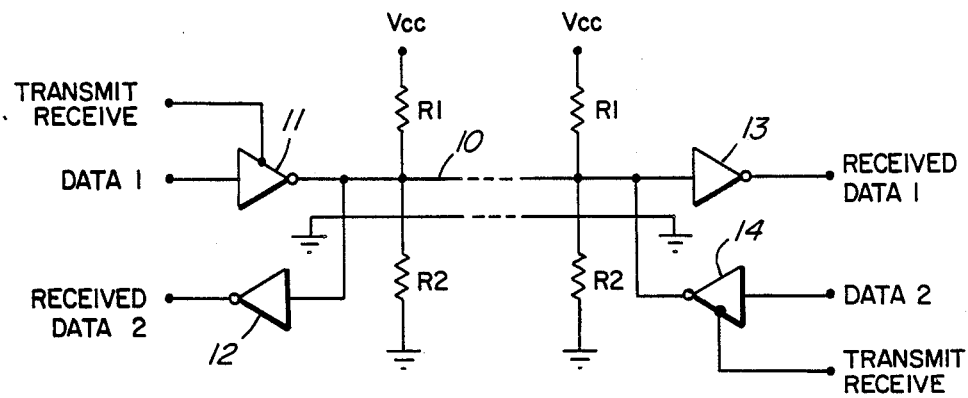
FIG. 1 is a schematic diagram of a conventional bidirectional bus terminating arrangement.

FIG. 1 illustrates a conventional bidirectional bus termination arrangement for an unbalanced system. A transmission line 10 is connected at one end to a line driver gate 11 and receiver gate 12, and at the other end to receiver gate 13 and the line driver gate 14. Each of these gates may conveniently be an off-the-shelf component such as Texas Instrument gate type SN74S240 for gates 11 and 14 and type SN74LS240 for gates 12 and 13. At each end of the transmission line 10 is a terminating network R1-R2 having its junction connected to the line 10. As discussed above, each network functions to terminate the line and prevent reflections of the data being transmitted from the opposite end of the bus.

Figure 2:
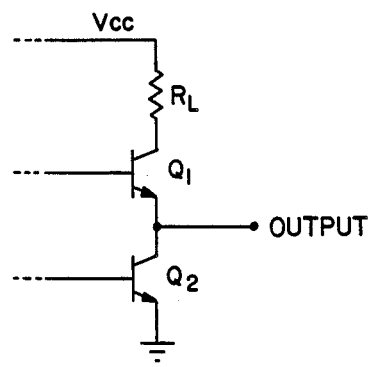
FIG. 2 illustrates the circuit output configuration of a typical three-state device.

FIG. 2 shows the totem-pole output circuit configuration of a three-state output gate such as drivers 11 and 14. The output terminal of the device is taken at the collector of a drive transistor $Q_2$ which has an internal load impedance to $V_{cc}$ comprised of transistor $Q_1$ and resistance RL. A three-stated gated device provides a low impedance LOW-state ($Q_1$-OFF and $Q_2$-ON), a low impedance HIGH-state ($Q_1$-ON and $Q_2$-OFF), and a high impedance OFF-state ($Q_1$ and $Q_2$-OFF). Therefore, when the receive control lead of gates 11 or 14 in FIG. 1 is activated, that gate is effectively disconnected from the bus 10.

Figure 3:
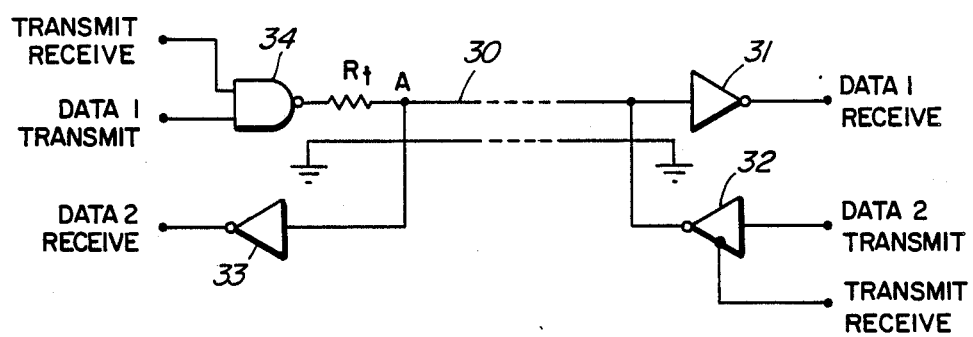
FIG. 3 is a schematic diagram of a bidirectional bus terminating arrangement in accordance with the invention.

FIG. 3 is a circuit diagram of a bidirectional bus termination arrangement in accordance with the invention. A line 30 is connected at one end to a receiving gate 31 and a transmit three-state gate 32. The other end of line 30 is connected to a data receive gate 33 and to a resistor $R_t$ having a value approximately the same as the characteristic impedance of the transmission line 30. The other end of the resistor $R_t$ is connected to a current sourcing line driver gate 34 having a first input for connection to a source of data and a second input for receiving transmit/receive control signals.

Gates 31 to 34 may be of a type having a totem-pole output configuration as shown in FIG. 2; however gate 34 must not be used as a three-state device. Gates 31–33 may be type 74LS240 whereas gate 34 may be type SN74S37. When the transmit/receive control lead of gate 34 is activated, the gate is transmitting data which is received at gate 31 through the series resistor $R_t$ and the line 30. Since the resistor is matched to the line, the line input initially rises to one half the final voltage. This wavefront travels down the line and is reflected at the receiver. When the reflection reaches node A, the voltage thereat rises to its final amplitude. The receiver however, sees one transition from the initial to the final amplitude. When the driver gate 34 switches from HIGH to LOW a similar situation occurs, in which the input of the line sees at first a step to one-half the final value and, two line delays later, the final LOW condition.

When gate 32 transmits on the line, the data is received by gate 33 from node A which is the junction of the line 30 and the matching resistor $R_t$. The transmit/receive lead of gate 34 being set to receive causes a logic HIGH to appear at its output terminal. Gate 34 is not a three-state device and because its transistor $Q_2$ is OFF but its transistor $Q_1$ is ON, $R_t$ effectively serves as a parallel terminating resistor for the line 30. When the gate 32 is driving HIGH, the current requirement is that of the high level input current to gate 33 (e.g. about 20 microamps), and when the gate 32 is driving LOW, the necessary current (about 18 milliamps) is drawn through $R_t$ and transistor $Q_1$ of gate 34. On the other hand, when gate 34 is driving HIGH and LOW, the current requirements are simply that of the respective high level and low level current requirements to gate 31. These are about 20 and 200 microamps respectively for the embodiment described above. These power requirements are very much lower than those for a conventional bidirectional bus terminating arrangement such as described in conjunction with FIG. 1. Assuming that data flows equally in both directions over a transmission line and that it is equally composed of logic highs and lows, the termination configuration of the invention provides a reduction of about 27.5 milliamps per path over a conventional configuration using 220/330 ohms terminating resistors at each end of the path. Since lower power gates can be used in this circuit, a further reduction of about 17 milliamps is obtained. For a sixteen-bit wide data bus at five volts, this is a power saving of about 3.5 watts. In view of the miniaturization and compactness of contemporary equipment, this is a significant saving indeed.

What is claimed is:

1. A bidirectional data bus arrangement comprising, a transmission line having a first and a second end, the first end terminating to a first node connected to a first gate for receiving data from the transmission line and to a second gate for transmitting data on the transmission line, the second end of the transmission line terminating at a second node connected to a third gate for receiving data transmitted by the second gate and to one end of a resistor having a value approximately matching that of the characteristic impedance of the transmission line, the other end of the resistor being connected to a current sourcing line driver gate having a totem-pole output configuration, the driver gate being controlled conventionally when it is outputting data and controlled to be in its low impedance HIGH-state when data is being received by the third gate.

* * * * *